J. J. WARD.
ROTARY ENGINE.
APPLICATION FILED MAY 19, 1919.
1,326,313.
Patented Dec. 30, 1919.
2 SHEETS—SHEET 1.
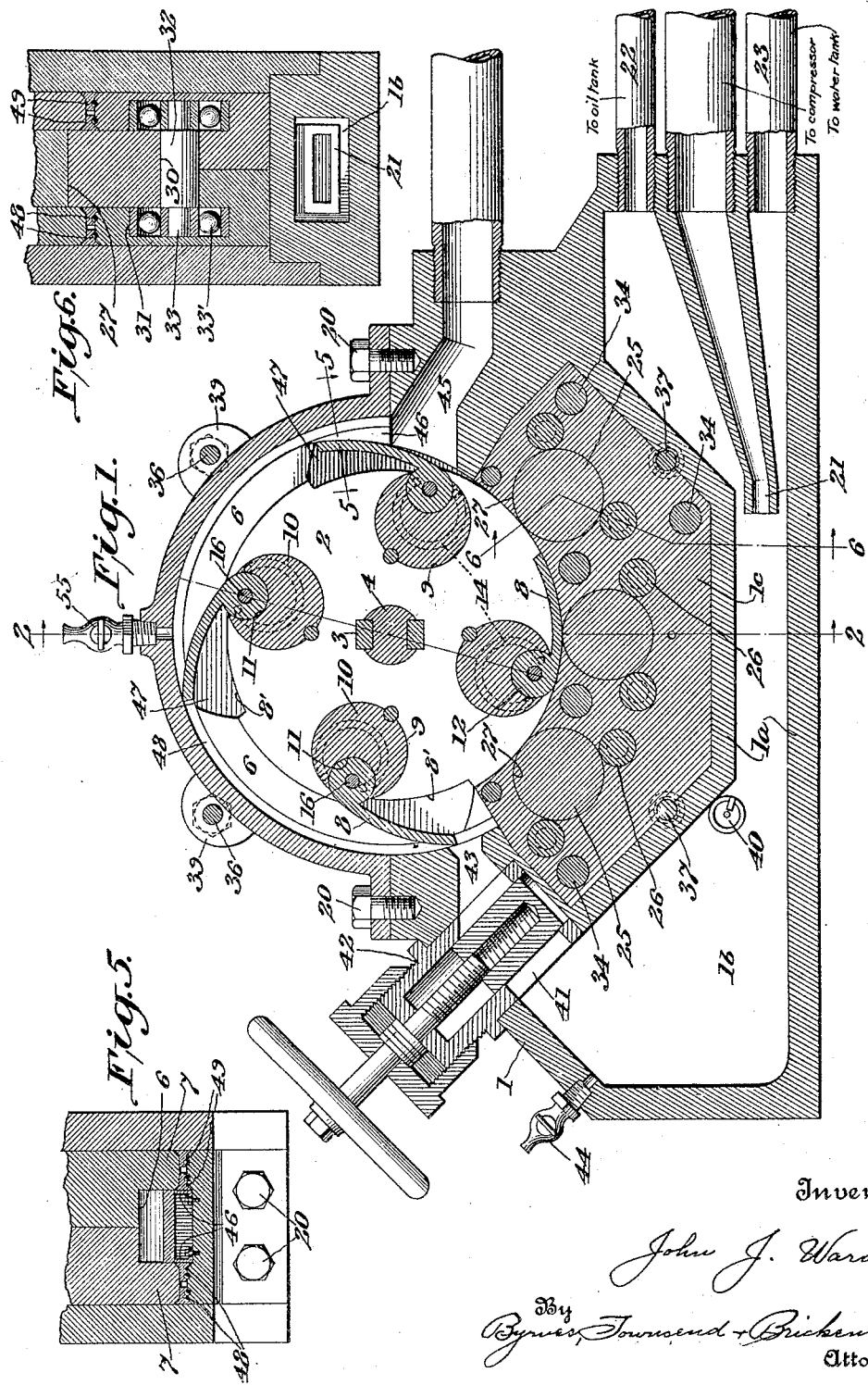
Inventor:
John J. Ward,
By Byrnes, Townsend & Brickenstein,
Attorneys.

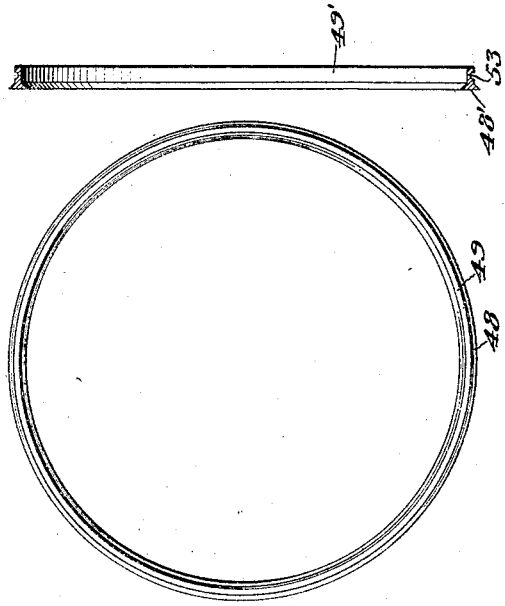

UNITED STATES PATENT OFFICE.

JOHN J. WARD, OF SEATTLE, WASHINGTON.

ROTARY ENGINE.

1,326,313.  Specification of Letters Patent.  Patented Dec. 30, 1919.

Application filed May 19, 1919. Serial No. 298,154.

*To all whom it may concern:*

Be it known that I, JOHN J. WARD, a citizen of the United States, residing at Seattle, in the county of King and State of Washington, have invented certain new and useful Improvements in Rotary Engines, of which the following is a specification.

This invention relates to rotary engines.

It is the principal object of the invention to reduce the friction between the stationary structure and the rotor element to a practical minimum and at the same time prevent the fluid driving medium from leaking out.

It is a more particular object to provide between the stationary frame and the rotor element a plurality of rollers firmly contacting with the rotor element which rollers, while offering relatively little friction against the motion of the rotor, effectively prevent the fluid from passing between them the channel 6, said blades being so dimensioned as to completely intercept the channel when in outward direction.

To make the blades, the rotor and the mounting of the blades simple in construction and to facilitate the assembly thereof, I preferably provide cylindrical bores 9 in the rotor to receive cylindrical blocks 10. These blocks have bores 11 to receive the cylindrical hinge elements 12 forming the base of the blades. Pins 13 may be used to fix the blocks 10 in definite position in the bores 9. Springs 14 are interposed between the ends of blocks 10 and the ends of the bores 9 and engage the blocks 10 and the hinge elements 12 respectively to normally force the blades 8 into the outermost position. The rotor has peripheral recesses 8' adapted to receive the blades 8 when they are forced to their innermost position.

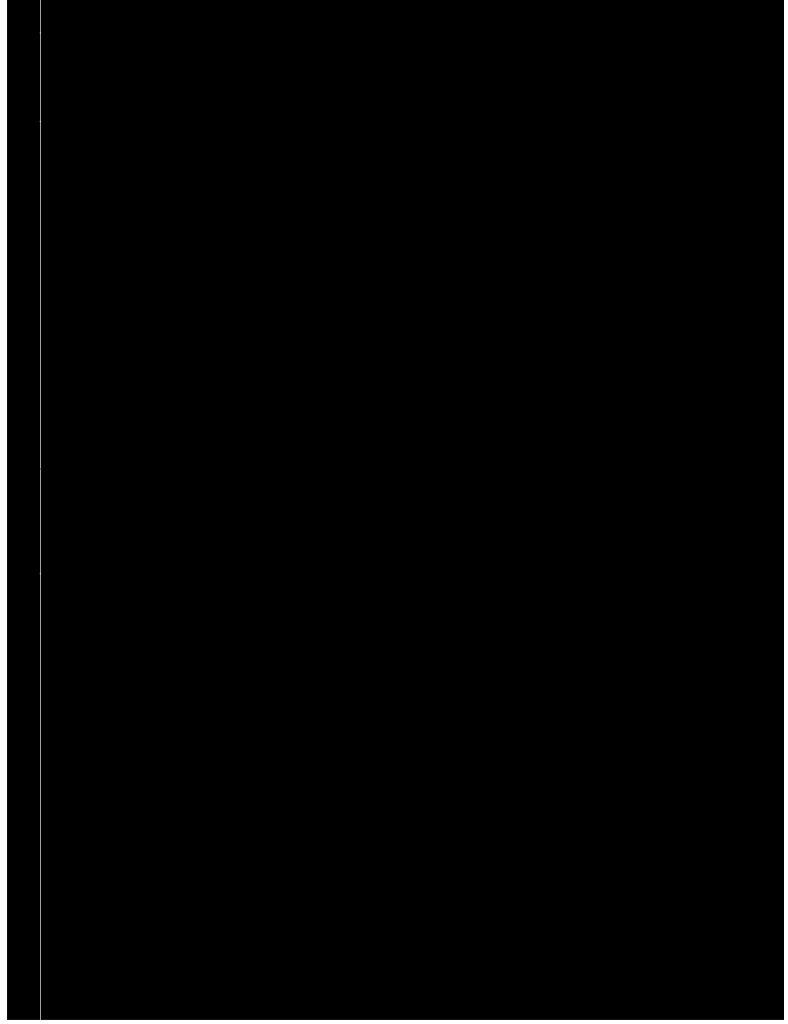

nected to a compressor 24 and the pipes 22 and 23 to supplies of oil and water respectively.

Above the combustion chamber is a frame 1ᶜ in which are mounted the antifriction rollers 28 supported by separate rollers 32. The frame 1ᶜ is, like the rotor, divided in two halves. Bores 27, preferably three in number, extend from the abutting faces of the two halves toward the outer face a distance equal to one half the width of channel 6 so that the two halves may inclose the rollers 25 which just take up the space between the flanges 7 of the rotor. The rollers 28 are so disposed that they bear against the rotor surface and support the rotor without causing much friction.

Adjacent the bores 27 are bores 30 extending from the abutting faces of the roller frame members toward the outer faces and terminate in bores 31 extending beyond the ends of bores 27. Bores 30 receive rollers 32 which have journals 33 extending into bores 31 and are pivotally supported in roller bearings 33 mounted in bores 31. The rollers 32 contact with rollers 25 and support them. When the rollers 25 and 32 are placed in position the two halves of the frame 1ᶜ are secured together by means of bolts 34 the heads of which are countersunk in the outer surfaces of the frame.

The frame 1ᶜ is set into a recess of corresponding shape of the frame 1ᵃ from which it may be removed after the side portions 1ᵉ have been taken off.

The side plates 1ᵉ, the upper portion 1ᵈ and the lower portion 1ᵃ are interconnected by means of bolts 36 and bolts 37. The bolts 36 extend through ears 39 on the side plates 1ᵉ. The bolts 37 interconnect the side plates in a similar manner, but are formed as expansion bolts and pass between the roller frame 1ᶜ and the adjoining surface of frame 1ᵃ so that by movement of bolts 37 the roller frame 1ᶜ may be raised or lowered to adjust the contact between rollers 28 and the surface of the rotor.

From the combustion chamber 1ᵇ in which a spark plug 40 may be suitably placed, a passage 41 for the products of combustion leads to the space defined by the channel 6 in the outer surface of the rotor and the surrounding wall of the stationary frame. This passage 41 is controlled by a valve mechanism 42 which may be of any desired design and terminates in a nozzle 43. A cock 44 may be provided to establish at will communication between the combustion chamber and the atmosphere.

Approximately opposite the intake nozzle 43 is the outlet 45 leading from the channel 6 into the atmosphere or to a device for utilizing the heat energy of the exhaust gases. As clearly indicated in Figs. 1 and 5, the wall of the upper frame portion 1ᵈ is provided with two ribs 46 projecting into the space defined by the channel 6 directly adjacent the flanges 7 so as to leave the central portion of the channel 6 unobstructed. These ribs curve gradually inwardly and merge into the upper surface of the roller frame 1ᶜ. By this arrangement the blades 8 are gradually forced into the recesses 8' while at the same time the gas is free to escape to the outlet 45. The ribs 46 are very narrow so that the gas passage is substantially unobstructed and back pressure avoided. If desired, the upper frame portion 1ᵈ may be widened so as to gradually enlarge the space between the rotor and the stationary frame adjacent the outlet 45 and intermediate the ribs 46 to further reduce the back pressure.

I prefer to form small depressions 47 in the inner face of the flanges 7 adjacent the blades 8 and make the blades of a width to contact with the bottom walls of the depressions. The depressions are coextensive with the range of movement of the blades 8 so that when the blades reach their outermost position, the backs of the blades contact with the slightly projecting curved side walls of the recesses which limit the motion of the blades and form a seal against the gas. The curvature of these walls is of course such that the tips of the blades just contact with the inner surface of the stationary frame, but do not have frictional bearing thereon.

Intermediate the peripheral surface of the flanges 7 and the stationary frame structure I provide a novel packing composed of two pairs of rings 48 and 49, a single ring being shown in detail in Figs. 3 and 4. These rings which may be of iron, steel or other suitable material comprise each a beveled base 48' and a web portion 49' rectangular in cross-section. The peripheral surface of the flanges 7 as well as the adjacent portions of the stationary frame have beveled facelets to form seats for the beveled portions of the rings. The rings, as clearly shown in Fig. 2 are so disposed that the web portions are turned toward each other and slightly separated to define a narrow annular space therebetween. This space is, as indicated in Fig. 6, connected by a duct 50 and pipe 51 with the suction side of the compressor 24. In this way the rings are firmly drawn into contact with the parts of the rotor and the stationary frame respectively and effectively prevent the gas from leaking out. The contact surfaces, however, are automatically adjustable so that friction is reduced to a practical minimum. It may be found desirable to interpose roller bearings between the packing rings and the frame. For this purpose I provide ball races 53 on the rings and the frame portion and connect these races by ducts 54 with the outside of the frame. Through these ducts the balls may be introduced into the races and a cap screw 60 may be employed to cover the ducts.

At the top of the upper frame portion 1ᵈ I preferably provide a cock 55. The operation is as follows:

The engine is cranked by hand or by a suitable starter as is well understood, while the load is disconnected. The igniter which may be of any suitable type, such as the vibrator operated type, sets off the combustible mixture and the products of combustion enter through the passage 41 into the space between the rotor and the stationary frame and expanding bring pressure to bear against that blade which happens to be nearest to the inlet. The force of expansion causes the rotor to move, bringing successively other blades into the path of the expanding gases.

The roller frame 1ᶜ, which is a solid block except as to the bores 28 and 32, prevents passage of gas from the pressure side to the exhaust and the rollers 28 through their intimate contact with the surface of the rotor prevent leakage along the contact surface. The seal between the blades and the flanges 7, as described, reduces leakage of the gas through the channel 6 and the packing rings 48 and 49 effectively prevent leakage through the contacting surface between the stationary frame and the rotor, so that substantially all or at least a very large percentage of the driving fluid is converted into useful work.

The nozzle 21 is connected to the outlet of the compressor 24 and also to a compressed air tank (not shown) in communication with the compressor. By use of suitable check-valves the air tank thus constitutes an equalizer for delivering the air more uniformly to the combustion chamber and produce a more uniform combustion therein.

The compressor 24 is of the same design as the rotary engine and is for this reason not specifically described. While the invention is described as a rotary engine in connection with a combustion chamber, it is understood that it may be applied to various uses. The term "rotary engine" is therefore intended as a generic term including all devices in which the invention may find application.

It is understood that suitable oil ducts are provided in practice to all wearing parts especially to the rollers 28 and 32, such ducts being omitted for the sake of clearness.

I claim:

1. In a rotary engine the combination of the stationary frame, the rotor, a packing element between the said parts, a source of negative pressure and means for causing said negative pressure to act upon the packing to hold it in contact with said parts.

2. In a rotary engine the combination of the stationary frame, the rotor, a packing ring forming a seal between the said parts, a source of negative pressure and means for causing said negative pressure to act upon the packing ring to hold it in contact with said parts.

3. In a rotary engine the combination of a rotor having a channel in the peripheral surface, blades therein, a stationary frame surrounding the motor, packing rings adapted to form a seal between the motor and the stationary frame, a source of negative pressure and means for causing said negative pressure to act upon the packing rings to hold them in contact with the frame and the motor.

4. In a rotary engine the combination of a rotor having a channel in the peripheral surface defining two flanges, blades in the channel, a stationary frame surrounding the rotor, a pair of packing rings between the rotor and the frame at each side of the channel and contacting with the inner and outer edge of each flange and the frame, and pneumatic means acting on each pair of rings to hold them in operative position.

5. In a rotary engine the combination of a rotor having a channel in the peripheral surface defining two flanges, a stationary frame surrounding the rotor, a pair of packing rings between the rotor and the frame at each side of the channel and contacting with the inner and outer edge of each flange and the frame, said rings being spaced from each other and inclosing a dead air space, and means for connecting said air space to a source of negative pressure.

6. In a rotary engine the combination of a rotor, a stationary frame surrounding the rotor, a packing ring forming a seal between the rotor and frame, said ring having a beveled portion and the rotor and frame having beveled seats for receiving the said beveled portion, and a ball bearing between the ring and the frame.

7. In a rotary engine the combination of a rotor, a stationary frame surrounding the rotor, a packing ring forming a seal between the rotor and frame, said ring having a beveled portion and the rotor and frame having beveled seats for receiving the said beveled portion, a ball bearing between the ring and the frame and negative pressure means for urging the beveled faces of the ring into contact with the seats on the rotor and the frame.

8. In a rotary engine the combination of a rotor, a stationary frame surrounding the rotor, a packing ring forming a seal between the rotor and frame, said ring having a beveled portion and an annular web portion, said rotor and frame having sufficient clearance to receive the web portion and having beveled seats to receive the said beveled portion, and a ball bearing intermediate the said web portion and the frame.

9. A packing ring for use in a rotary engine, comprising a beveled base and an annular web extending from the base, and a ball race in the said web.

10. In a rotary engine the combination of a stationary frame, a rotor having a channel in the peripheral surface defining with the said frame an expansion chamber, blades pivotally mounted in said chamber, a gas inlet, a gas outlet and means for preventing the direct passage of gas from the inlet to the outlet, said means comprising a solid frame member projecting into said channel and extending into close proximity to the bottom of said channel over a considerable angular portion thereof and antifriction rollers mounted in said frame member and contacting with the bottom and side walls of said channel.

11. In a rotary engine the combination of a stationary frame, a rotor having a channel in the peripheral surface defining with the said frame an expansion chamber, blades pivotally mounted in said chamber, a gas inlet, a gas outlet and means for preventing the direct passage of gas from the inlet to the outlet, said means comprising a solid frame member projecting into said channel and extending into close proximity to the bottom of said channel over a considerable angular portion thereof, antifriction rollers mounted in said frame member and contacting with the bottom and sides of said channel and auxiliary rollers mounted in the frame to support said antifriction rollers.

12. In a rotary engine the combination of a stationary frame, a rotor having a channel in the peripheral surface defining with the said frame an expansion chamber, blades pivotally mounted in said chamber, a gas inlet, a gas outlet and means for preventing the direct passage of gas from the inlet to the outlet, said means comprising a solid frame member projecting into said channel and extending into close proximity to the bottom of said channel over a considerable angular portion thereof, means for radially adjusting said frame member and antifriction rollers mounted in said frame member and contacting with the bottom and side walls of said channel.

13. In a rotary engine the combination of a stationary frame, a rotor, said frame and rotor being formed to define therebetween an expansion chamber along the periphery of the rotor, blades on the rotor projecting into the expansion chamber, a gas inlet, a gas outlet and means for preventing the direct passage of gas from the inlet to the outlet, said means comprising a frame member completely intercepting the said expansion chamber along the lower peripheral portion of the rotor and having a transverse bore contiguous to the rotor surface and a plurality of additional bores below said bore, a roller loosely revoluble in said first bore and bearing upon the rotor and rollers in the other bores for supporting the first roller.

In testimony whereof I affix my signature.

JOHN J. WARD.